United States Patent [19]

Hubers

[11] 4,196,231
[45] Apr. 1, 1980

[54] IMPREGNATING EQUIPMENT AND METHOD OF VACUUM IMPREGNATION

[76] Inventor: Ernst Hübers, Hahnenpatt 15, 4290 Bocholt, Fed. Rep. of Germany

[21] Appl. No.: 936,059

[22] Filed: Aug. 23, 1978

[30] Foreign Application Priority Data

Aug. 23, 1977 [DE] Fed. Rep. of Germany ....... 2737917

[51] Int. Cl.² .............................................. B05D 3/12
[52] U.S. Cl. ........................................ 427/240; 8/150; 8/154; 68/23 R; 68/197; 118/50; 118/52; 118/54; 118/423; 118/500; 427/430.1
[58] Field of Search ...................... 118/52, 54, 50, 500, 118/423, 56; 427/430 R, 240, 294; 68/197, 23 R; 8/150, 154

[56] References Cited

U.S. PATENT DOCUMENTS

| | | | |
|---|---|---|---|
| 1,105,055 | 7/1914 | Abbott | 427/240 |
| 1,525,255 | 2/1925 | Starks | 118/52 |
| 2,114,999 | 4/1938 | Fickett et al. | 118/50 |
| 2,387,299 | 10/1945 | Ronci | 118/54 |
| 2,387,300 | 10/1945 | Ronci | 118/52 |
| 2,419,260 | 4/1947 | Goodlatte | 118/54 |
| 3,601,086 | 8/1971 | Hostetter | 118/50 |
| 3,659,550 | 5/1972 | Fulton | 118/52 |
| 3,690,333 | 9/1972 | Kierner | 118/50 |

Primary Examiner—Ronald H. Smith
Assistant Examiner—Janyce A. Bell
Attorney, Agent, or Firm—Lerner, David, Littenberg & Samuel

[57] ABSTRACT

Impregnating equipment includes a centrifuge, a tank which can be exhausted and into which an impregnating compound can be introduced, and means for attaching at an upper part of the tank a mounting for a centrifugal basket, said mounting comprising a single self-aligning or swing bearing which is supported by a support which can be locked by means of an expanding device to the upper rim of the tank. The expanding device preferably consists of three radial arms which can be retracted and extended and the ends of which are in the form of jaws, the rim of the tank consisting of a ring the radially inwardly-directed cross-section of which has a shape mating with the shape of the jaws. A method of vacuum impregnation of articles utilizing such impregnating equipment comprises introducing the articles into the centrifugal basket, coupling the centrifugal basket with the basket drive mounting support, introducing the basket drive mounting support and the basket into the tank, releasing the coupling, removing the basket drive mounting support, closing and exhausting the tank, impregnating the articles, introducing air into and opening the tank, lowering the basket drive mounting support and coupling same to the centrifugal basket, lifting the basket drive mounting support and locking same to the tank, spinning the centrifugal basket by means of the basket drive mounting support to centrifuge off and return excess impregnating compound into the tank, releasing the locking means and lifting the basket drive mounting support and the centrifugal basket, and uncoupling and removing the centrifugal basket from the basket drive mounting support.

27 Claims, 8 Drawing Figures

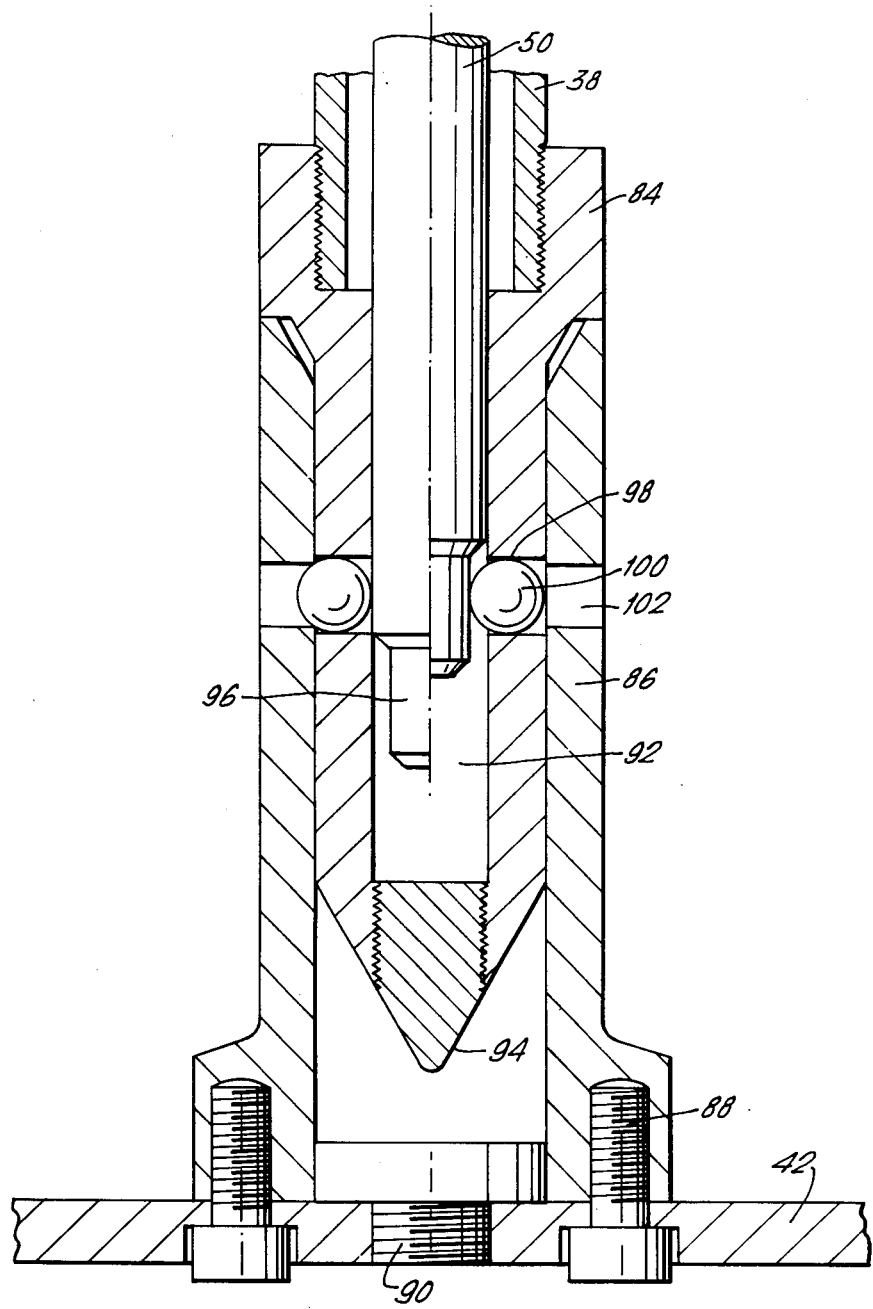

IMPREGNATING EQUIPMENT AND METHOD OF VACUUM IMPREGNATION

The invention relates to impregnating equipment which includes a centrifuge and an exhaustable tank to contain an impregnating agent or compound and having at an upper part thereof means for attachment of a mounting for a centrifugal basket.

Impregnating equipment of this general nature is known and serves, for example, to impregnate articles under vacuum with an impregnating compound and subsequently to free the articles of excess impregnating compound by centrifuging. For example, electronic components or porous castings may be impregnated with resins, in order to seal them.

A particular disadvantage of the impregnating equipment hitherto available has been the centrifuging procedure, through which excess impregnating compound or agent has been removed after the vacuum impregnation. Difficulties have resulted particularly in the event of asymmetrical distribution of the goods to be centrifuged or of the impregnated articles in the centrifugal basket, giving rise to intense shaking movements during the centrifuging procedure, because of which not only has the support of the centrifugal basket been heavily loaded, but the whole impregnating device equipment has also been vibrated, leading not only to mechanical disorders and precipitations, but also being associated with the generation of considerable noise.

The object of the invention is to provide impregnating equipment including a centrifuge, in which these disorders no longer occur.

According to the invention, we provide impregnating equipment comprising a centrifuge, a tank which can be exhausted and into which an impregnating compound can be introduced, said tank having at an upper part thereof means for attachment of a mounting for a centrifugal basket, said mounting comprises a single self-aligning bearing which is supported by a support which can be locked by means of expanding devices to the upper rim of the tank.

Because of this mounting, even when the goods are not symmetrically distributed in the centrifugal basket, imbalance movements can no longer be transmitted to the casing of the impregnating equipment, because the centre of rotation will automatically be adjusted in such a way that the centre of gravity of the revolving basket inclusive of the drive device lies precisely on the centre of rotation, the tube supporting the centrifugal basket describing a cone-shaped shell during the rotation, depending on the position of this centre of gravity.

Also, in accordance with the present invention, we provide a method of vacuum impregnation of articles with the use of impregnating equipment comprising a centrifuge, a tank which can be exhausted and into which an impregnating compound can be introduced, said tank having at an upper part thereof means for attachment of a mounting for a centrifugal basket, said mounting comprising a single self-aligning bearing which is supported by a support which can be locked by means of expanding devices to the upper rim of the tank, said method comprising introducing the articles into the centrifugal basket, coupling the centrifugal basket with the basket mounting support, introducing the basket mounting support and the basket into the tank, releasing the coupling, removing the basket drive mounting support, closing and exhausting the tank and impregnating the articles, introducing air into and opening the tank, lowering the basket mounting support and coupling same to the centrifugal basket, lifting the basket mounting support and locking same to the tank, spinning the centrifugal basket by means of the basket mounting support to centrifuge off and return excess impregnating compound into the tank, releasing the locking means and lifting the basket mounting support and the centrifugal basket, and uncoupling and removing the centrifugal basket from the basket mounting support.

An embodiment of the invention will now be described, by way of example, in more detail with reference to the accompanying drawings, in which:

FIG. 5 is a more-detailed sectional view of a coupling device between the centrifuge basket and the support tube.

Figure 1:
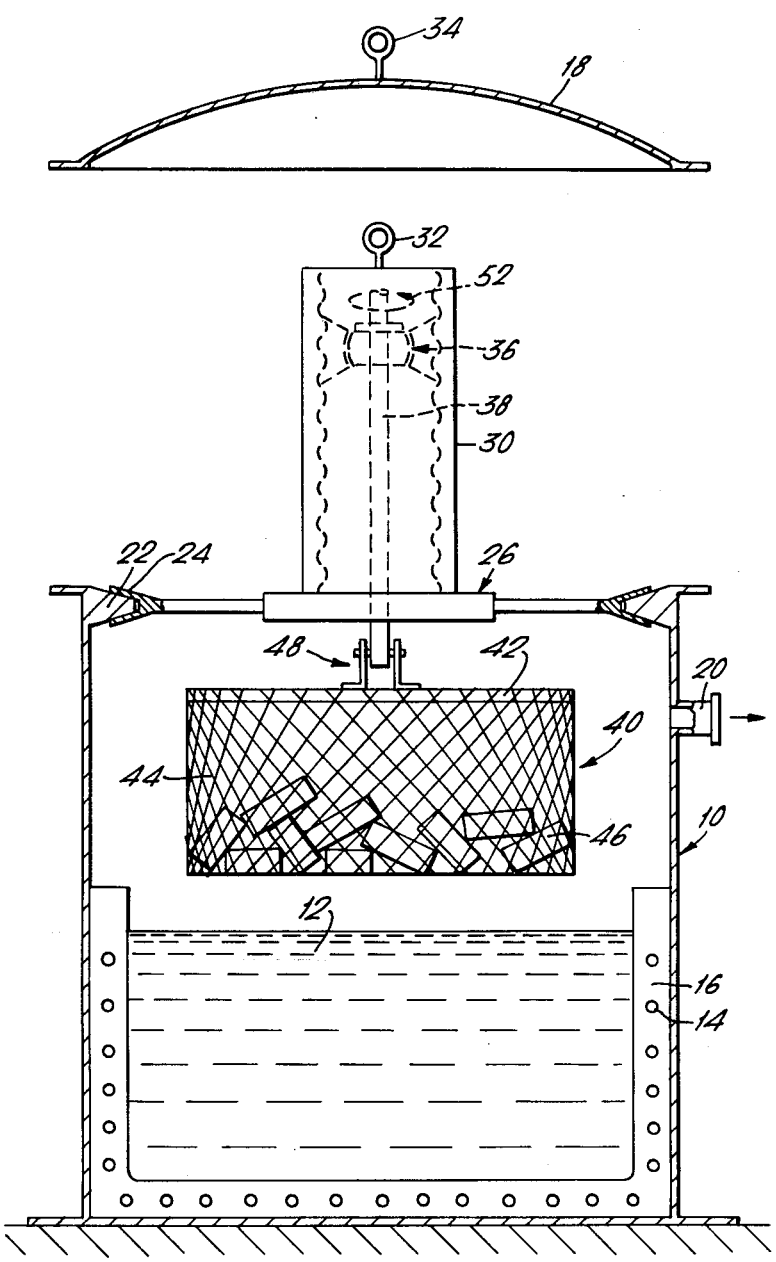
FIG. 1 is a diagrammatic view, partly in section of centrifuge-incorporating impregnating equipment according to the invention.

Referring now to the drawings, there is shown in FIG. 1 a tank 10 which contains an impregnating compound 12. In order to heat or cool the impregnating compound, there may be provided in the tank also suitable temperature-control devices consisting, for example, of heating or cooling tubes 14 which are encased in an embedding material 16. A cover 18 may be put on the tank 10, in order thereafter to establish a vacuum within the container through a connecting adapter 20.

The impregnating compound may, however, also be provided in another tank (not shown) which is disposed, for example, below the tank 10, which other tank would then have the temperature-control device, and a feed-pipe provided with a stop valve would lead therefrom into the tank 10. After establishment of the vacuum in the tank 10, the valve would be opened and the impregnating compound would be drawn into the tank 10 by the vacuum. This arrangement would have the advantage that, after the impregnating compound had flowed into the tank 10 and the valve had been closed, a pressure in excess of atmospheric pressure may be established simply through the connecting adapter 20 in order to improve introduction of the impregnating agent into the articles. Moreover, a better vacuum may be established to begin with, as the vapour pressure of the impregnating compound does not interfere.

Figure 2:
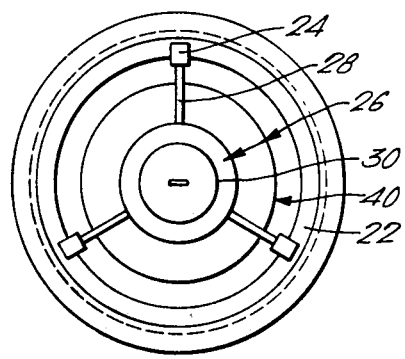
FIG. 2 is a plan view of the equipment of FIG. 1.

The tank has at its upper edge a radially and inwardly-projecting tapering ring 22 which is embraced by jaws 24 of an expanding device 26. The expanding device advantageously has three arms 28 which can be retracted and extended (see also FIG. 2).

The jaws 24 have inner contours which are conformed in a suitable way to the outer contours of the cross-section of the ring 22. The ring 22 may, for example, be triangular in cross-section, with a truncated apex, in which case the inner contour of the jaws is likewise of triangular shape. Naturally, other cross-sectional shapes are feasible, for example, segmental.

The expanding device 26 carries a carrying frame 30 at the upper end of which is situated a lifting lug 32 or the like enabling the complete arrangement to be lifted from the tank 10. Similar holding devices 34 should also be provided on the cover 18.

Within the carrying frame 30 at the upper end thereof is a self-aligning or swing bearing 36, by means of which a tube 38 may be supported to be rotatable and slewable to a limited extent. The tube 38 carries at its lower end outside of the carrying frame 30, a centrifugal basket 40 which comprises a gyratory plate 42 and a basket 44 attached thereto. The basket 44 may, for example, consist of wire netting, but may also be made of perforates sheet steel, depending on the stress to be anticipated during the centrifugal action and also depending on what material is to be impregnated within the centrifugal basket 40. There are shown articles 46, for example carburettor parts, which are still porous as a result of casting and which must be sealed by vacuum impregnation ("metal-densification"). In order to enable separation of centrifuge basket 40 from the carrying tube 38, there is provided a quick coupling device 48 which will be described hereinafter in more detail. The quick coupling 48 connects the gyratory plate 42 with the tube 38 and may be operated, for example, by means of an operating rod (part 50 in FIGS. 4 and 5) extending within the tube 38 and not shown in this Fig.

At the upper end of the tube 38 there is a rotary drive which is indicated in FIG. 1 only by the arrow 52.

The rotary drive may be realized by an electric motor which is set up on the upper end of the tube 38, the rotor of the motor (not shown) being connected rotatively fast with the tube 38, while the stator is prevented from rotation, but is so supported that it does not prevent the movement of the swinging tube 38 in the self-aligning swing bearing 36.

Figure 4:
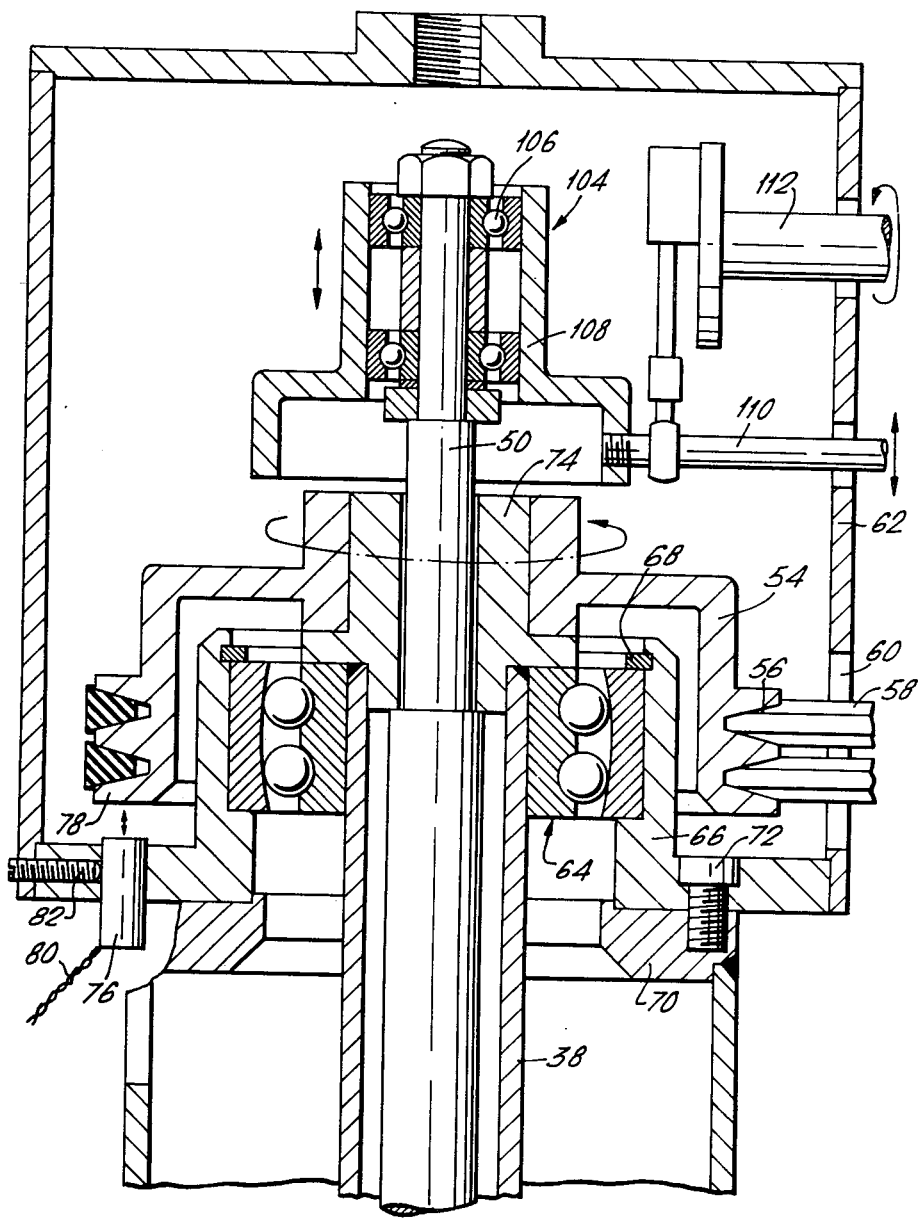
FIG. 4 is a more-detailed sectional view of the centrifuge, particularly of the pendulum bearing arrangement, the drive and the coupling rod operating means.

Another embodiment for the drive is shown in greater detail in FIG. 4. Here the drive is effected by means of a V-belt pulley 54, which, in the embodiment shown, has two V-belt grooves 56, into which are fitted two V-belts 58. The V-belts are passed to the exterior through an opening 60 in a housing 62 enclosing the whole arrangement and can at that point be connected with a suitable drive V-belt pulley. In order that the radial traction exerted by the V-belts may not exercise any influence on the swinging movement of the tube, the line of application of the traction load of the V-belts 58 should pass exactly through the centre of gyration of the swinging movement, so that the effective lever arm is zero. This is realized in the embodiment shown in FIG. 4.

The self-aligning or swing bearing shown in FIG. 4 is a spherical self-aligning or swing bearing 64 which is confined within a bearing seat 66, secured by a retaining ring 68. The bearing seat 66 in turn is mounted on a ring 70, for example, with the use of screws 72, and itself supports the already-mentioned housing 62.

The tube 38 is held by the bearing 64 by means of a supporting casing 74 which is welded to the tube 38. The supporting casing 74, moreover, carries the V-belt pulley 54.

Instead of the spherical self-aligning or swing bearing shown in FIG. 4, there may also be provided another bearing which permits a pendulum or swinging movement in addition to the rotary movement. A universal coupling would be a possible solution, for example.

In the case of severe imbalance, caused, for example, by all of the articles 46 having accumulated on one side of the centrifugal basket, the deflection of the tube 38 and thus also that of the basket 40 can become so great that the basket would be in contact with the inner wall surface of the tank 10, which could lead to operating problems and damage to the basket and to the inner wall surface of the tank. In order to recognise such excessive deflection or inclination, there could be provided between the carrying frame 30 and the tube 38 or parts rigidly attached to the tube 38, such, for example, as drive pulley 54 or gyratory plate 42, contactor devices which produce an alarm when contact is made, which alarm, for example, causes cutting-off of the rotary drive. A particularly advantageous construction is shown in FIG. 4, where there is provided an initiator 76 which is mounted in such a way that, on approach of the side surface 78 of the V-belt pulley 54, it delivers an electrical signal through the lead wire 80. The manner of operation of such an initiator, that is a proximity contactor, need not be further explained; these initiators usually operate in such a way that the oscillation frequency of an oscillator is altered by the approach of a metal part, in this case, for example, the V-belt pulley 54 composed of metal.

The initiator 76 may be held by a screw 82 and can thus be easily exchanged or the distance thereof from the V-belt pulley may be adjusted. Another kind of attachment is made possible by providing the initiator with an external thread and screwing it in.

As will become clearly apparent in the following, it is advantageous to provide a quick coupling 48 between the centrifugal basket 40 and the carrying tube 38. FIG. 5 shows one construction of such a coupling, consisting of a tubular shaft 84 which is secured at the lower end of the tube 38, for example, by being screwed thereonto, and a sleeve 86 which, for its part, is mounted on the gyratory plate 42, for example by means of screw bolts 88 and centering screw 90. The bore of the shaft 84 is denoted 92 and the lower end of the bore 92 is closed by a screwed-in tip 94, the tapering being intended to simplify introduction of the shaft 84 into the sleeve 86.

The diameter of bore 92 is so selected that the operating rod 50 fits precisely therein, said rod 50 in turn having at its end a portion 96 of reduced diameter. The shaft 84 has radially-disposed bores 98 with a diameter slightly greater than the wall thickness of the shaft wall resulting from the bore 92. In each of the radial bores 98, of which there may be several, there is located a ball 100 with a diameter which again is slightly greater than the wall thickness of the shaft 84. Corresponding to the bores 98 in the shaft 84 there are arranged in the sleeve 86 indentations 102 the diameter of which is slightly smaller than the ball diameter. The indentations 102 may also be bores passing through the sleeve wall.

The portion 96 of the operating rod 50 has a diameter reduced to the extent that the balls 100 can withdraw inwards when the portion 86 is adjacent the bores 98, sufficiently far for the balls 100 no longer to project beyond the outer wall surface of the shaft 84, (see the right-hand side of FIG. 5). The shaft 84 may then be withdrawn from the sleeve 86, and in this way the centrifugal basket may be separated from the carrying tube.

If this operating rod 50 is displaced, however, in such a way that the operating rod 50 comes to lie with its normal diameter adjacent bores 98, (see the left-hand side of FIG. 5), the balls 100 are pushed outwards into the indentations 102 and thereby wedge the shaft 84 with the sleeve 86.

Suitable stop devices may be provided to prevent loss of the balls, but this is not illustrated in the drawings.

In order to enable upward and downward movement in the required way of the operating rod 50, an axial driving arrangement 104 may be provided according to FIG. 4. According to the drawing, this arrangement consists of two ball-bearings 106 screwed on to the end of the operating rod 50, and which hold a manipulating cap 108 in a manner not shown. It will be seen that this cap makes possible an upward and downward movement of the operating rod 50, without the rotary movement of the latter being hindered. The manipulating cap 108, for its part, can be moved with the help of various devices, for example by a lever 100 leading directly to the exterior and not shown in detail, or alternatively by an eccentric drive 112, which should make clear diagrammatically that the upward and downward movement of the cap 108 can also be converted into a rotary movement which is sometimes more advantageous from the control point of view.

It should furthermore be pointed out that the extent of the imbalance caused by the articles 46 leads to a deflection or inclination of the tube 38, which depends not only on the length of the tube 38, but also on the percentage portion of this imbalance mass to the overall mass of the revolving structure. It is therefore advantageous to design the overall mass as relatively large, for example by a gyratory plate with a relatively large rotary inertial mass. On the other hand it should be borne in mind that increases of the inertial mass also increases the required drive power.

Figure 3A:
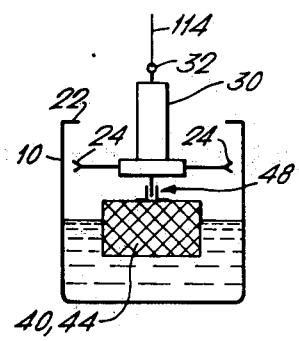
FIGS. 3a to 3d illustrate diagrammatically, the sequence of operations during vacuum impregnation of articles.
Figure 3B:
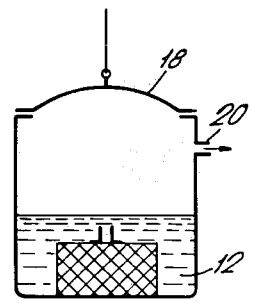
Figure 3C:
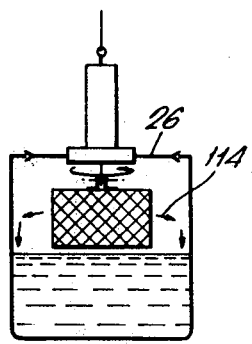

FIGS. 3a to 3d illustrate a particularly advantageous operating procedure. In accordance with this procedure the articles to be impregnated are first inserted into the centrifugal basket 40, 44. Then the basket drive mounting support 30, suspended from a lifting gear 114, is connected by means of the coupling 48 with the basket 40, and the whole arrangement is lowered into the tank 10. (FIG. 3a). As soon as the basket 40 touches down on the bottom of the tank 10, whereby it is already covered by the impregnating liquid 12, the coupling 48 is released by the actuation of coupling rod 50, and the basket drive mounting support 30 is removed. The tank 10 is now provided with a cover 18, and the tank 10 is evacuated through the connecting adapter 20 (FIG. 3b). The gases contained in the articles to be impregnated emerge because of the underpressure, and rise upwards in the liquid 12. When the extraction of gas from the articles is adequate, air is again passed into the tank 10, whereby the impregnating liquid now enters into the pore spaces from which gas has been removed. The cover 18 is taken off and the basket drive mounting support 30 is again brought in and coupled to the basket 40. The basket drive mounting support 30 with the basket 40 is then raised and the basket drive mounting attachment 30 is locked by means of the expanding device 26 to the rim 32 of the tank 10. The centrifuge drive is now switched on and excess impregnating liquid is centrifuged off (see arrow 114). The centrifuged liquid runs back to the supply 12 from the rim of the tank (FIG. 3c).

Figure 3D:
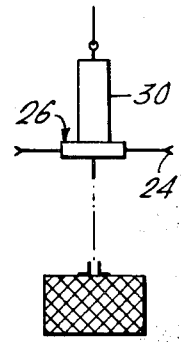

After the centrifuging procedure has ended the expanding device 26 is retracted and the whole arrangement is lifted out of the tank 10, and the centrifugal basket is separated from the basket drive mounting support 30 (FIG. 3d). Another centrifugal basket, which has meantime been loaded, may now be coupled with the basket drive mounting support, and the next load impregnated.

It will readily be seen that the procedure is very rapid and reliable, and that excess impregnating liquid is not lost during the procedure. Moreover, in this procedure, any imbalances of the centrifugal basket are not transferred to the tank, and the noise is consequently considerably reduced, which may be of considerable importance to operating personnel.

I claim:

1. Apparatus for impregnating articles comprising a tank having an upper rim, means for evacuating said tank, means for introducing an impregnating liquid into said tank, basket means for retaining said articles, centrifuge means including self-aligning bearing means for rotating said basket means, and support means for releasably affixing said self-aligning bearing means to said upper rim of said tank so that when said support means is affixed to said upper rim of said tank, said basket means is rotatable within said tank, and when said support means is released from said upper rim of said tank said basket means can be removed from said tank.

2. The apparatus of claim 1 wherein said support means includes an expandable device movable between a first configuration for engagement with said upper rim of said tank and a second configuration released from engagement with said upper rim of said tank.

3. The apparatus of claim 2 wherein said expandable device comprises a plurality of retractable radial arms.

4. The apparatus of claim 3 wherein said plurality of retractable radial arms comprises three retractable radial arms.

5. The apparatus of claim 3 including affixing means at the end of each of said plurality of radial arms, and wherein said upper rim of said tank protrudes inwardly and has a crosssectional shape for mating with said affixing means.

6. The apparatus of claim 5 wherein said crosssectional shape of said upper rim of said tank comprises that of a triangle having a truncated apex.

7. The apparatus of claim 1 including a housing supported by said support means, said bearing means being centrally located within the upper portion of said housing.

8. The apparatus of claim 1 wherein said self-aligning bearing means comprises a self-aligning ball bearing.

9. The apparatus of claim 1 wherein said centrifuge means includes tubular connector means having a first end and a second end, said first end of said tubular connector means extending through said bearing means, and wherein said basket means is affixed to said second end of said tubular connector means.

10. The apparatus of claim 9 wherein said centrifuge means for rotating said basket means includes rotary drive means for rotating said first end of said tubular connector means.

11. The apparatus of claim 1 wherein said self-aligning bearing means comprises a universal coupling.

12. The apparatus of claim 11 wherein said centrifuge means includes tubular connector means having a first end and a second end, said first end of said tubular connector means extending through said universal coupling, and wherein said basket means is affixed to said second end of said tubular connector means.

13. The apparatus of claim 12 wherein said centrifuge means includes rotary drive means for rotating said first end of said tubular connector means.

14. The apparatus of claim 10 or 13 wherein said rotary drive means includes at least one pulley mounted at said first end of said tubular connector means, and including belt means for rotating said pulley, said pulley being mounted relative to said self-aligning bearing means so that the tensile load produced thereby passed through the center of pendular motion of said tubular connector means.

15. The apparatus of claim 9 or 12 including detecting means for detecting greater than a predetermined amount of pendular motion of said tubular connector means.

16. The apparatus of claim 15 including a housing supported by said support means, said bearing means being centrally located within said housing, and wherein said detector means is mounted relative to said housing so as to detect said pendular motion by contacting said centrifuge means.

17. The apparatus of claim 14 including a housing supported by said support means, said bearing means being centrally located within said housing, and detector means for detecting greater than a predetermined amount of pendular motion of said tubular connector means, and wherein said detector means comprises a proximity contactor mounted relative to said housing so as to detect said pendular motion by contacting said pulley means.

18. The apparatus of claim 1 wherein said centrifuge means includes coupling means for coupling and uncoupling said basket means therefrom.

19. The apparatus of claim 18 wherein said centrifuge means includes tubular connector means having a first end and a second end, said first end of said tubular connector means extending through said bearing means, and wherein said basket means is affixed to said second end of said tubular connector means, said coupling means being associated with said second end of said tubular connector means.

20. The apparatus of claim 19 wherein said coupling means includes sleeve means mounted on said basket means so that said second end of said tubular connector means is slidably engageable with the inner surface of said sleeve means, and including actuating means for releasably engaging said tubular connector means with said inner surface of said sleeve means.

21. The apparatus of claim 20 including a tubular shaft affixed to said second end of said tubular connector means, said tubular shaft being slidably engageable with said inner surface of said sleeve means, said tubular shaft including radially extending passages therethrough, and wherein said sleeve means includes radially extending passages therethrough, said radially extending passages in said shaft means and said radially extending passages in said sleeve means being alignable with each other and wherein said actuating means comprises ball means movable within said radial extending passages of said shaft means, the diameter of said ball means being greater than the thickness of the walls of said shaft means so that at least a portion of the surface of said ball means can extend into said radially extending passages in said sleeve means when said radially extending passages are in alignment, and said actuating means further including rod means slidably engageable with the inner surface of said shaft means so that when said rod means is in juxtaposition with said radially extending passages in said shaft means, said ball means are forced outwardly into said radially extending passages in said sleeve means.

22. The apparatus of claim 21 wherein said rod means has a first diameter substantially coinciding with the inner diameter of said shaft means and wherein said rod means includes a portion having a second diameter less than said first diameter, so that when said second diameter portion of said rod means is in alignment with said radial passages in said shaft means said ball means does not project into said radial projections in said sleeve means, thereby releasing said shaft means from said sleeve means.

23. The apparatus of claim 20 including driving means for linearly moving said rod means within said tubular connector means.

24. The apparatus of claim 23 wherein said driving means is located at said first end of said tubular connector means for linearly driving said rod means therefrom.

25. A method of impregnating articles in a centrifugal basket means disposable within a tank havng an upper rim, said centrifugal basket including releasable support means for releasably suspending said basket means from said upper rim of said tank, said method comprising disposing said articles in said basket means, attaching said basket means to said releasable support means, introducing said basket means and said releasable support means into said tank, releasing said releasable support means from said basket means so that said basket means remains in said tank, introducing an impregnating liquid into said tank, closing and evacuating said tank so as to impregnate said articles with said impregnating liquid, opening said tank, affixing said releasable support means to said basket means within said tank, suspending said basket means within said tank by affixing said releasable support means to said upper rim of said tank, centrifuging said impregnated articles by rotating said basket means suspending in said tank, releasing said releasable support means from said upper rim of said tank, and removing said releasable support means and said basket means from said tank.

26. A method of claim 25 wherein said impregnating liquid is introduced into said tank subsequent to closing and evacuating said tank.

27. The method of claim 25 including increasing the pressure in said tank to a pressure greater than that of atmospheric pressure subsequent to closing and evacuating said tank and prior to opening said tank.

* * * * *